B. L. FETHEROLF.

Improvement in Coal Screens.

No. 122,882.                                Patented Jan. 23, 1872.

Witnesses:                                  Inventor:

UNITED STATES PATENT OFFICE.

BENNEVILLE L. FETHEROLF, OF BOROUGH OF TAMAQUA, PENNSYLVANIA.

IMPROVEMENT IN COAL-SCREENS.

Specification forming part of Letters Patent No. 122,882, dated January 23, 1872.

SPECIFICATION.

I, BENNEVILLE L. FETHEROLF, of the borough of Tamaqua, in the county of Schuylkill and State of Pennsylvania, have invented a certain Improvement in Segments, made of cast-iron or any composition of metals, for Coal-Screens, of which the following is a specification:

The nature of my invention relates to the combination of knobs or teeth and diagonal bars and cross-bars, forming squares or meshes of different sizes. The knobs or teeth are on the inside of the screen and on the center of each angle of the squares or meshes. The object of my invention is to clean coal more perfectly than by any other screen now in use, by causing more agitation while the screen is revolving, keeping the coal from lying directly on the bottom of the screen to allow the dirt to pass through the meshes more expeditiously, and not allow the dirt to cake or harden and pass through the screen with the coal.

Figure 1:
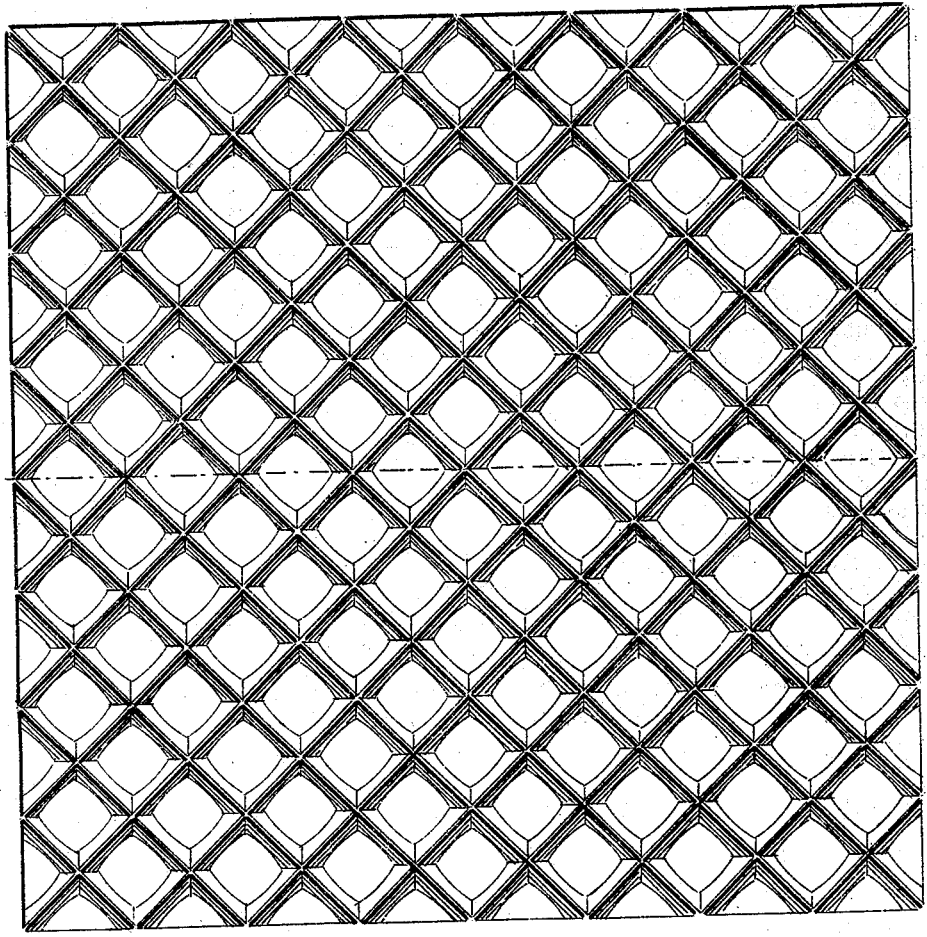
Figure 2:
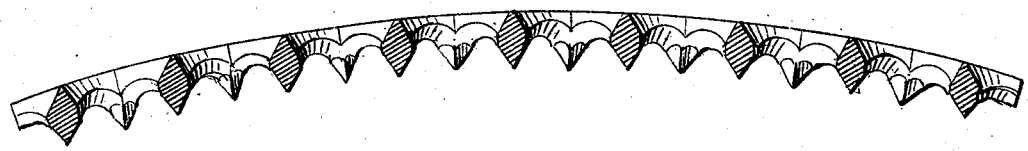

Figure 1 is an inside view of a segment with diagonal bars and cross-bars, knobs or teeth. Fig. 2 is an end view of a segment, showing the knobs or teeth.

The segments are made either in squares or oblong squares, with diagonal bars and cross-bars, bevel on the inside and on the outside, with the knobs or teeth on the center of each angle of the squares or meshes, and fastened on spiders on a shaft with bolts or nuts or otherwise, forming a complete screen for screening coal. The knobs or teeth are made either loose or stationary.

I claim as my invention—

The combination of diagonal bars and cross-bars, bevel on the inside and on the outside, with knobs or teeth on the inside, substantially as and for the purpose hereinbefore set forth.

B. L. FETHEROLF.

Witnesses:
    FRANKLIN A. BEMIS,
    L. MACKEY.